Feb. 6, 1945.  M. MITCHKO  2,368,720
THREADING MACHINE
Filed May 18, 1943  9 Sheets-Sheet 2
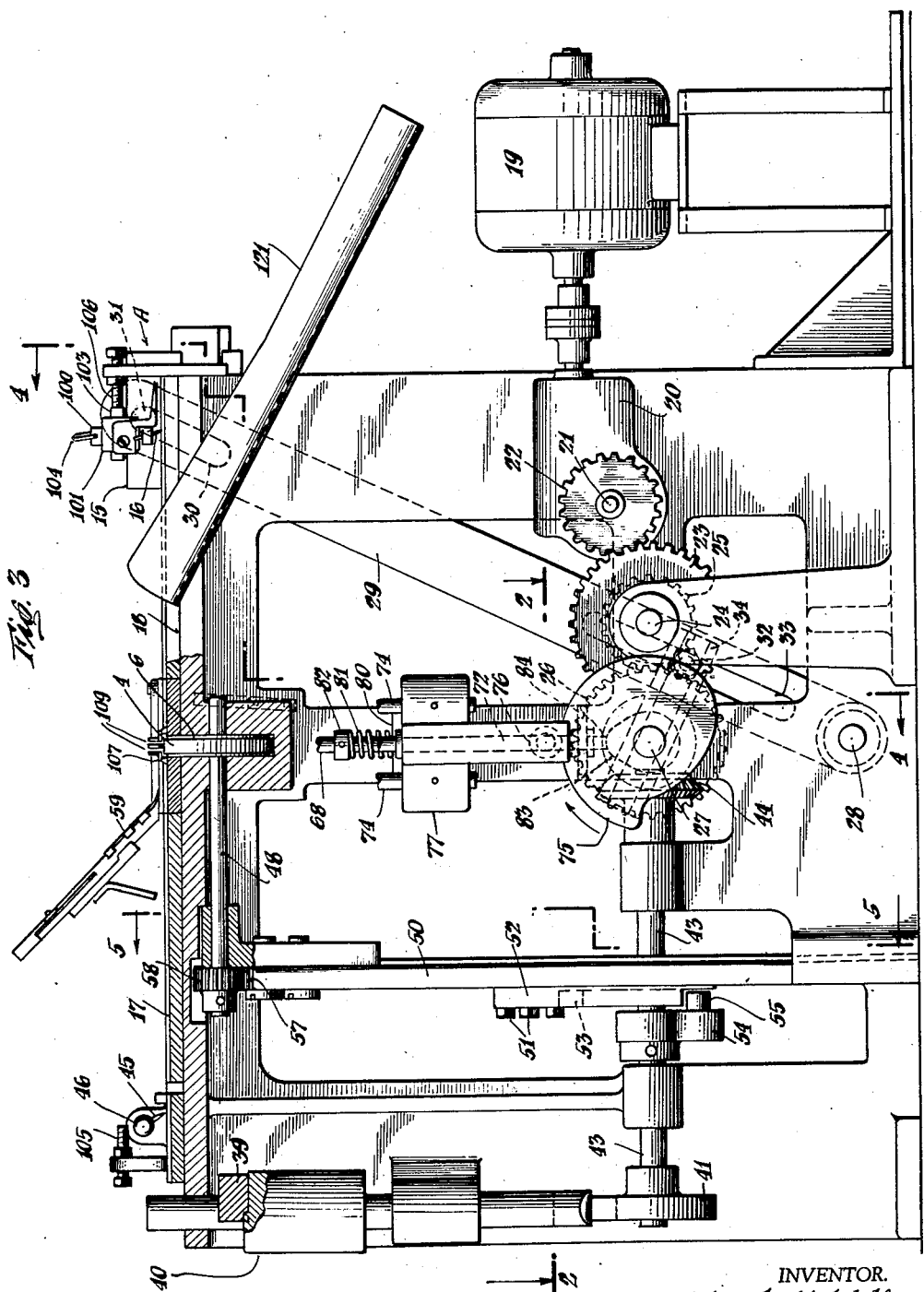
INVENTOR.
Michael Mitchko
BY
ATTORNEY

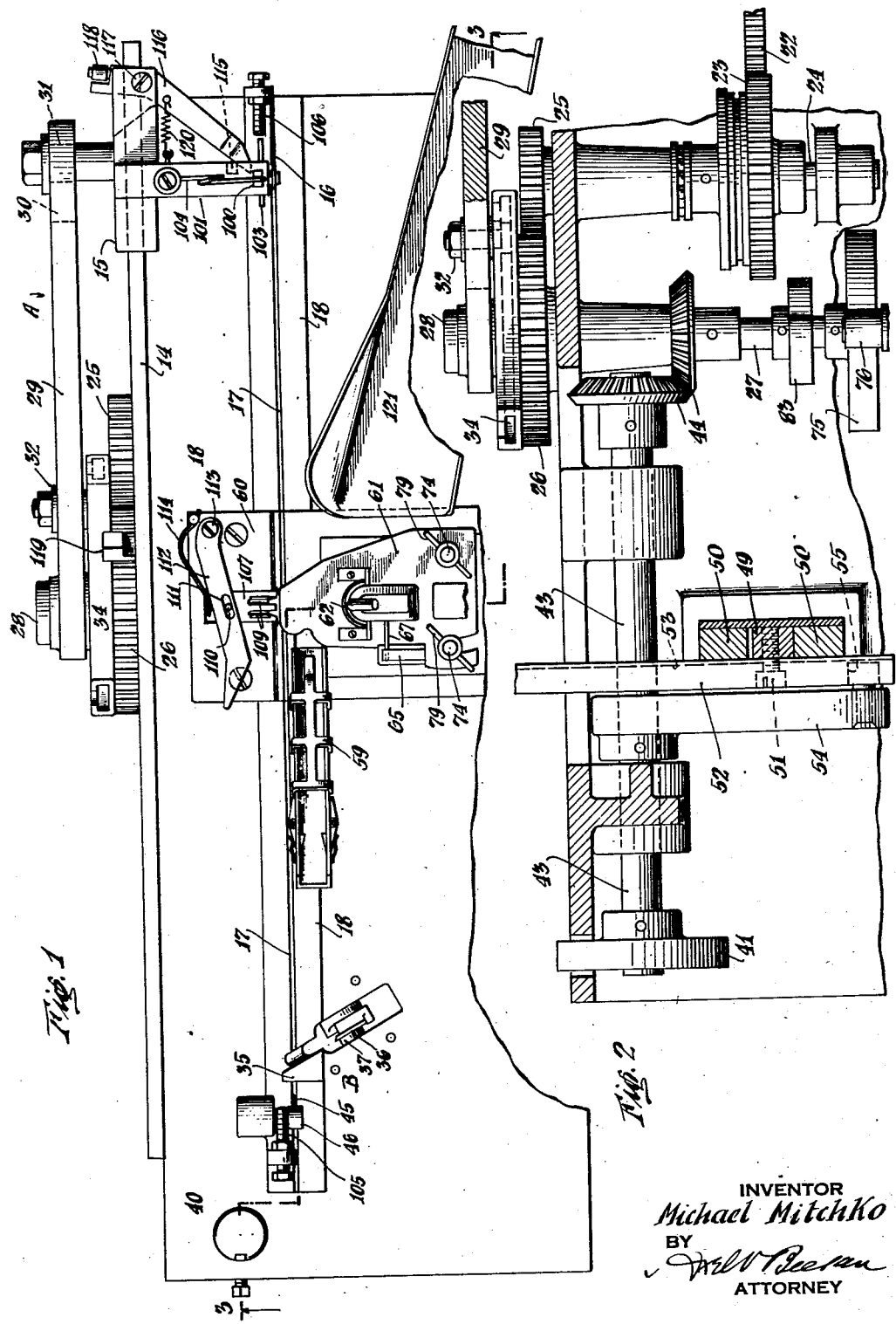

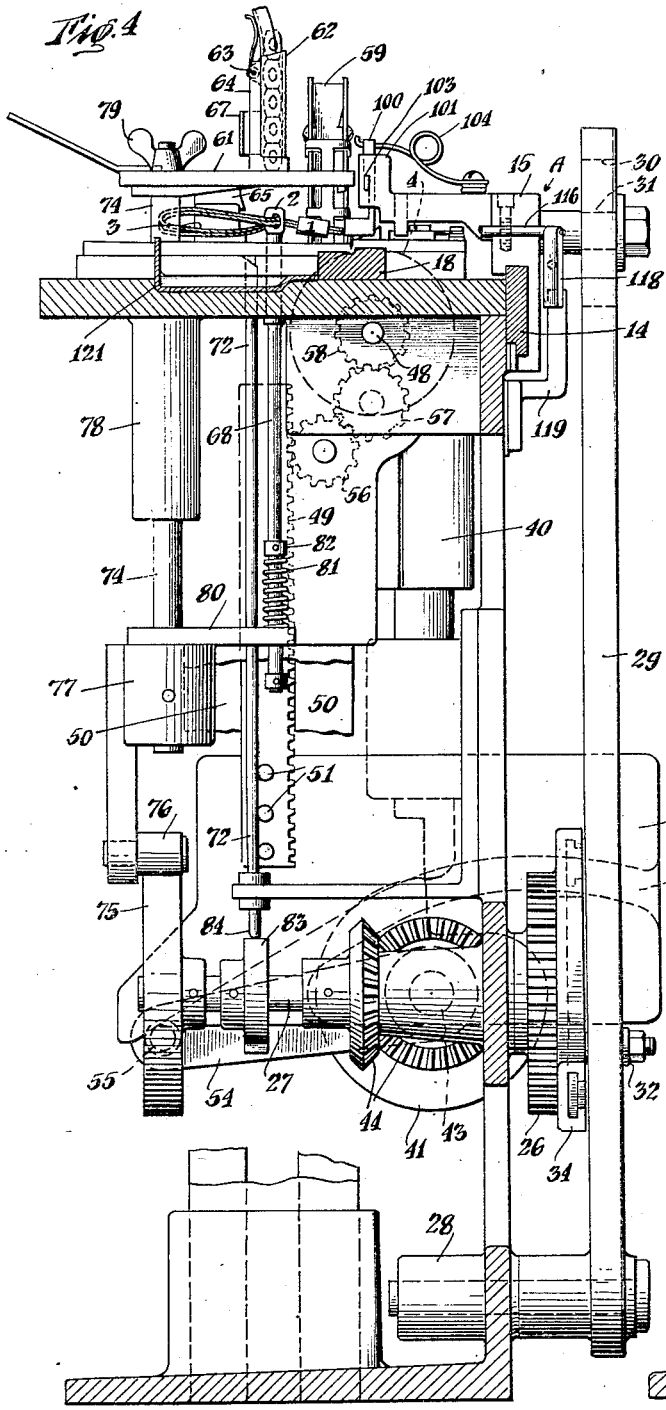
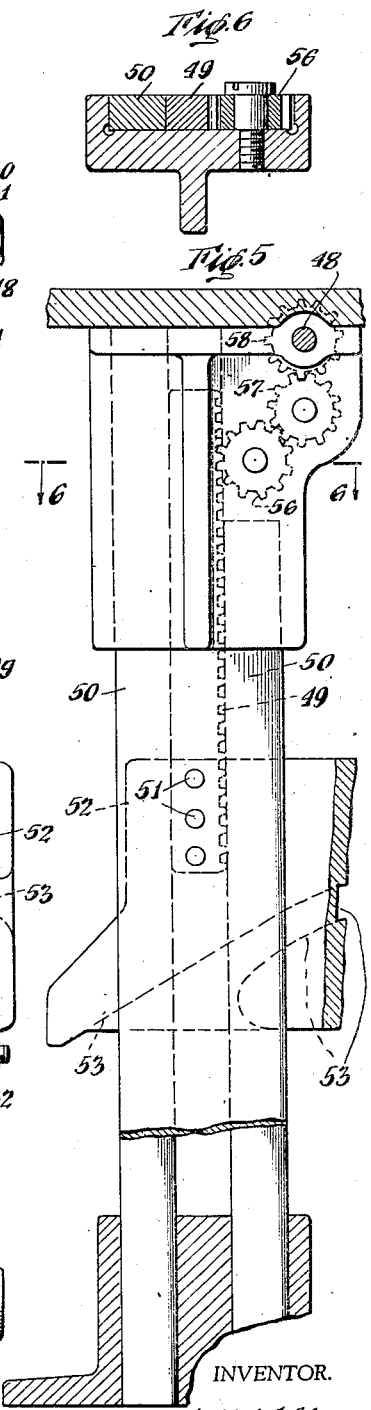

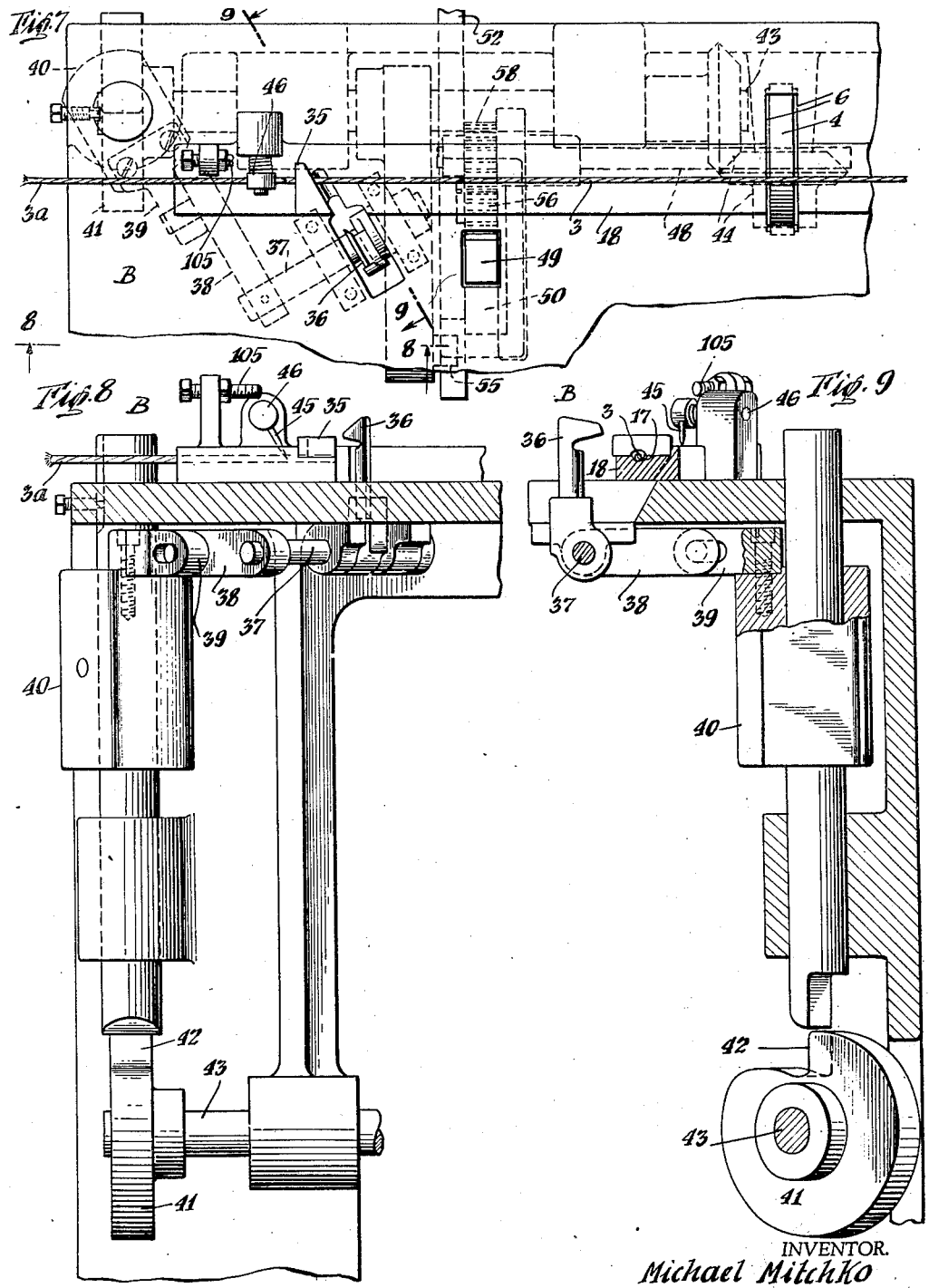

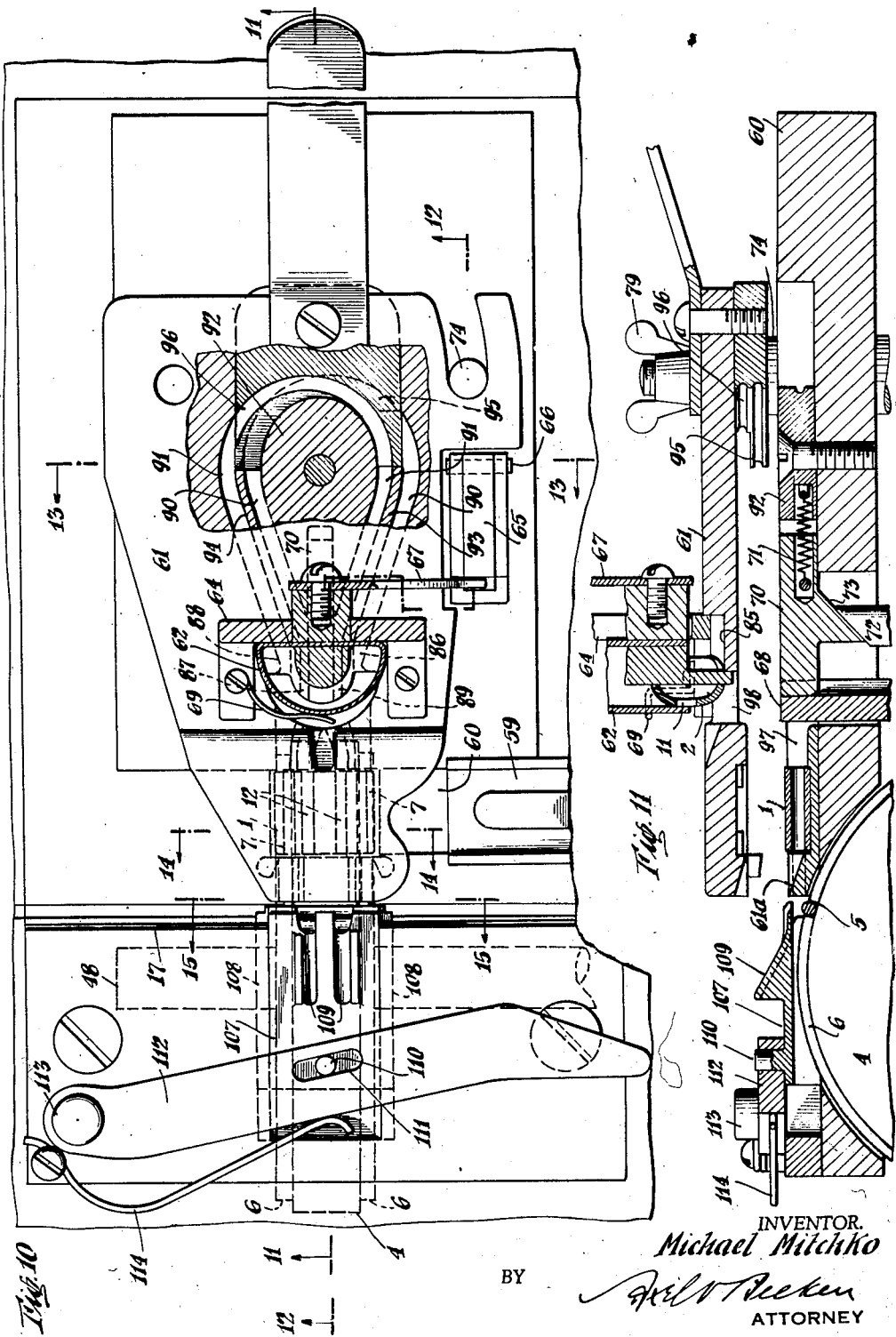

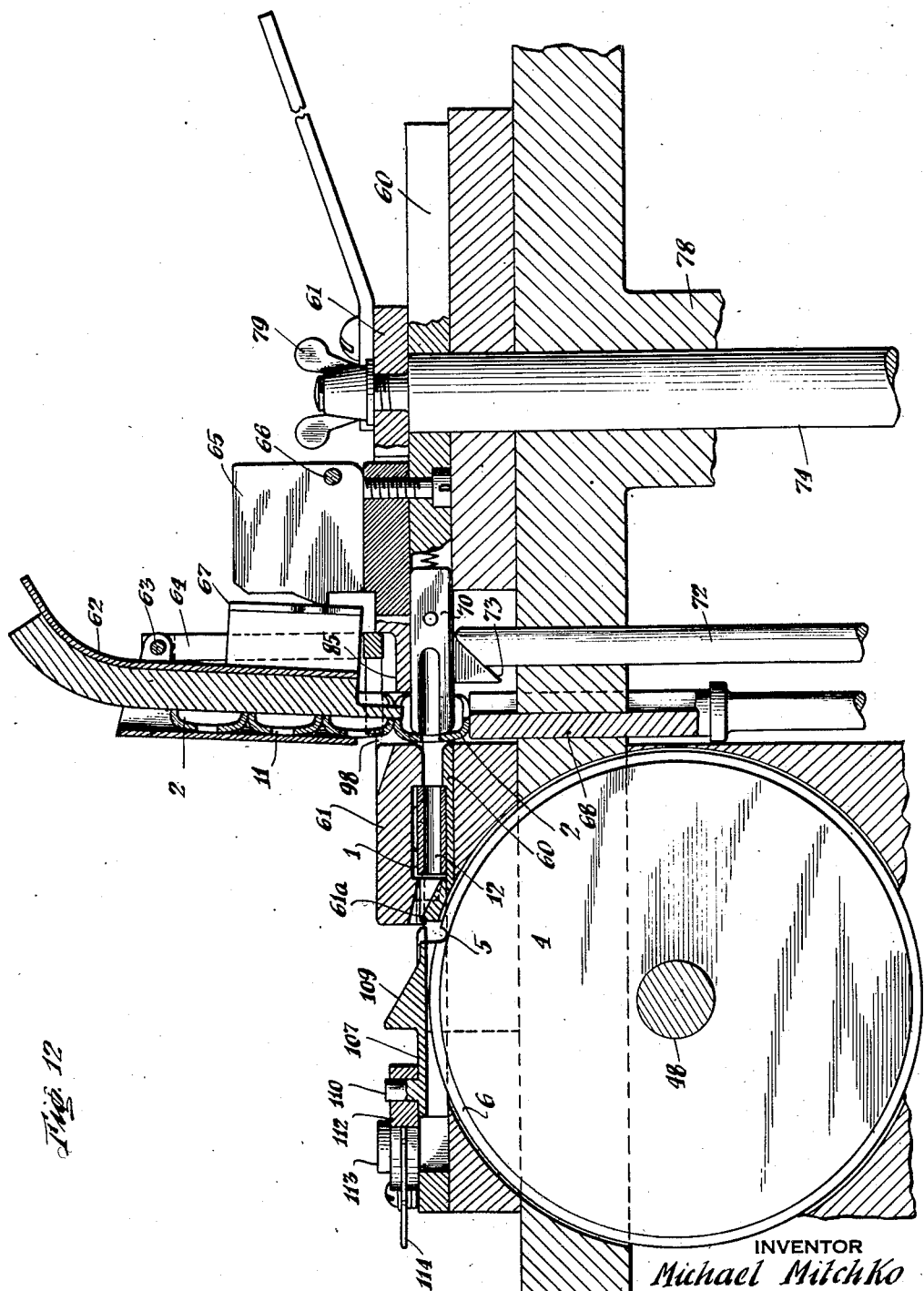

Feb. 6, 1945.   M. MITCHKO   2,368,720
THREADING MACHINE
Filed May 18, 1943   9 Sheets-Sheet 7
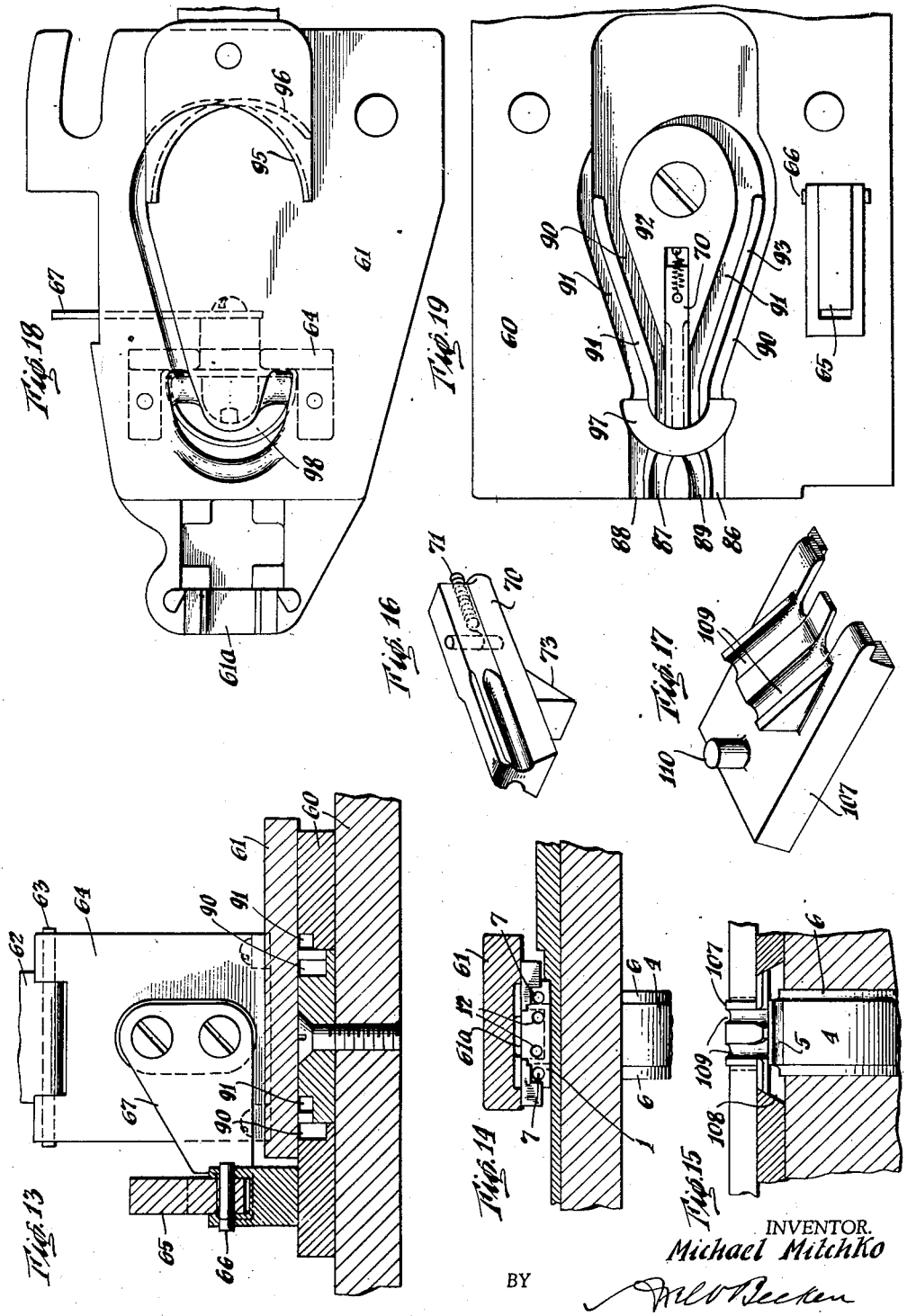
INVENTOR.
Michael Mitchko
BY
ATTORNEY Feb. 6, 1945. M. MITCHKO 2,368,720
THREADING MACHINE
Filed May 18, 1943 9 Sheets-Sheet 8
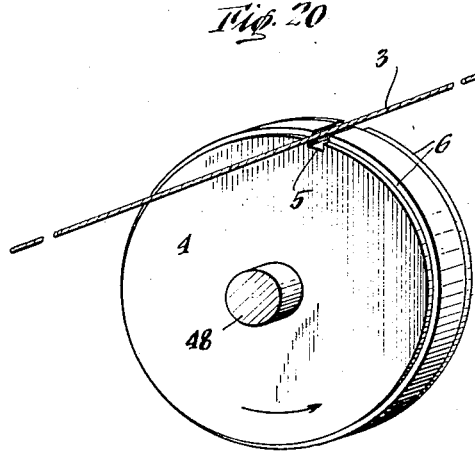
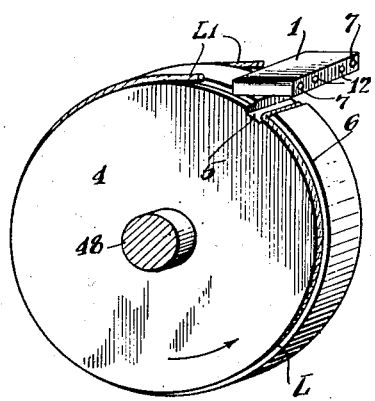
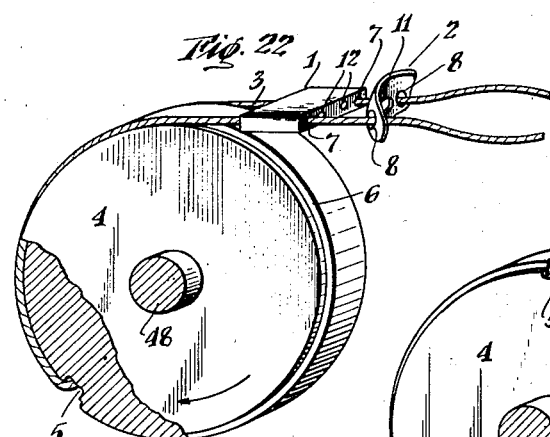
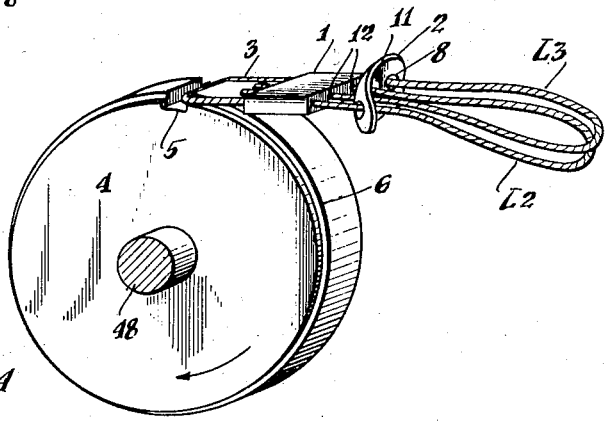
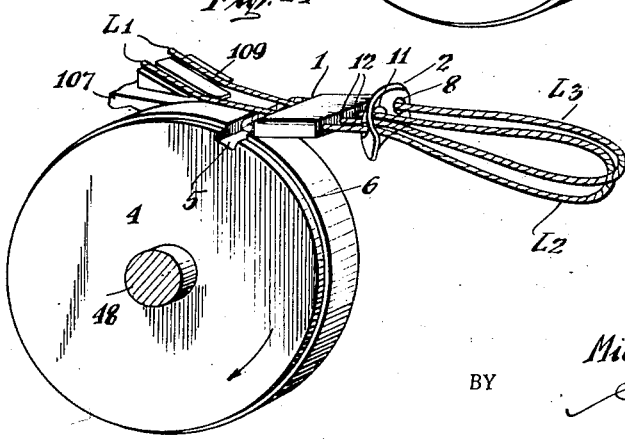
INVENTOR.
Michael Mitchko
BY
ATTORNEY

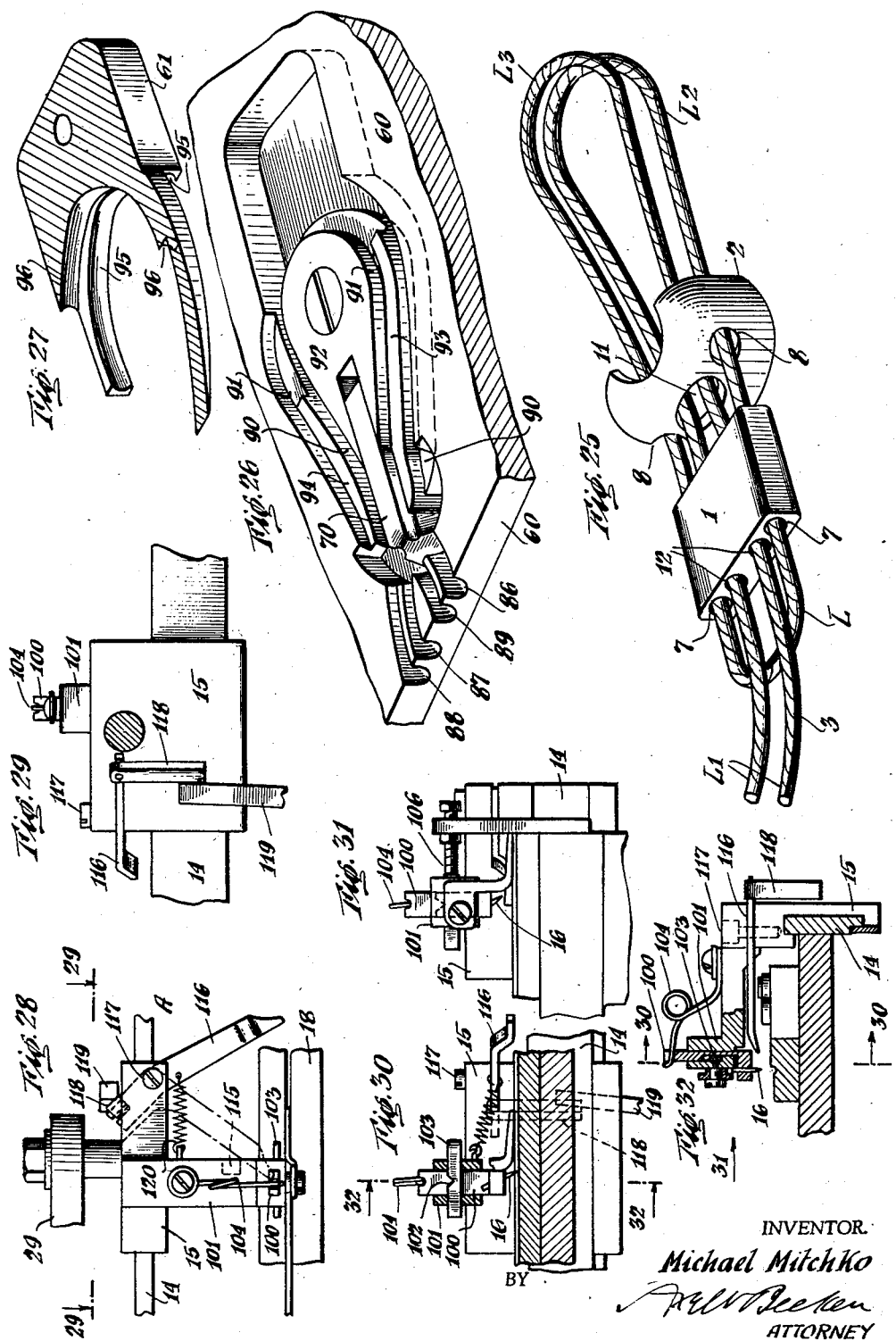

Patented Feb. 6, 1945

2,368,720

UNITED STATES PATENT OFFICE 2,368,720

THREADING MACHINE

Michael Mitchko, Irvington, N. J., assignor to E. J. Brooks Company, Newark, N. J., a corporation of New Jersey Application May 18, 1943, Serial No. 487,499

2 Claims. (Cl. 29—241)

This invention relates to threading devices for threading a double strand into and reversely back through one or more sealing elements, and has for its main object and feature the production of a device for accomplishing this in a more facile manner than heretofore and by much simpler means than those formerly employed.

In the accompanying drawings, the invention is shown in a concrete and preferred form in which:

Fig. 1 is a top plan view, partly broken away, of a machine embodying the invention;

Fig. 2 is a horizontal sectional view substantially on the plane of line 2—2 of Fig. 3;

Fig. 3 is a vertical sectional view substantially on the plane of irregular line 3—3 of Fig. 1;

Fig. 4 is a vertical sectional view substantially on the plane of irregular line 4—4 of Fig. 3;

Fig. 5 is a vertical sectional view substantially on the plane of irregular line 5—5 of Fig. 3;

Fig. 6 is a detail sectional view substantially on the plane of line 6—6 of Fig. 5;

Fig. 7 is a fragmentary detail plan view of the left-hand end of Fig. 1;

Fig. 8 is a vertical sectional view substantially on the plane of line 8—8 of Fig. 7;

Fig. 9 is a vertical sectional view substantially on the plane of line 9—9 of Fig. 7;

Fig. 10 is a detail plan view of the central portion of Fig. 1, with parts broken away and in section;

Fig. 11 is a vertical sectional view substantially on the plane of line 11—11 of Fig. 10;

Fig. 12 is a vertical sectional view substantially on the plane of line 12—12 of Fig. 10;

Fig. 13 is a fragmentary vertical sectional view substantially on the plane of line 13—13 of Fig. 10;

Fig. 14 is a fragmentary vertical sectional view substantially on the plane of line 14—14 of Fig. 10;

Fig. 15 is a fragmentary vertical sectional view substantially on the plane of line 15—15 of Fig. 10;

Fig. 16 is a perspective detail view of the holding dog for the seal guard;

Fig. 17 is a perspective detail view of the stripper or deflecting mechanism for the threaded strand of the seal assemblage;

Fig. 18 is a plan view of the die-face of the upper threading die;

Fig. 19 is a plan view of the die-face of the lower threading die;

Figs. 20 to 24 inclusive are a series of perspective views, somewhat diagrammatic, to illustrate the successive steps in the threading of the seal;

Fig. 25 is a perspective view of the threaded seal assemblage produced by the machine;

Fig. 26 is a perspective view, partly broken away, of the lower threading die;

Fig. 27 is a fragmentary perspective view of the upper threading die;

Fig. 28 is a fragmentary plan view of the upper right-hand corner of Fig. 1;

Fig. 29 is a detail sectional view substantially on the plane of line 29—29 of Fig. 28;

Fig. 30 is a sectional detail view substantially on the plane of line 30—30 of Fig. 32;

Fig. 31 is a detail view looking in the direction of arrow 31 of Fig. 32; and

Fig. 32 is a sectional detail view substantially on the plane of line 32—32 of Fig. 30.

Attention is first directed to Fig. 25 which shows a sealing means such as is disclosed in U. S. Letters Patent, to Brooks, No. 2,163,660, of June 27, 1939. The sealing means here consist of a perforated member 1 of compressible material such as lead, and a perforated so-called gripping and severing member or guard 2 of non-compressible material such as sheet steel, but, if desired, member 2 can be omitted. The strand, such as a flexible cord of fibrous material, is indicated at 3.

It will facilitate the explanation and understanding of the machine that is to be presently described if the major stages of operation are considered at this point, and for this purpose Figs. 20 to 25 inclusive will be utilized.

Sealing means 1 or 1 and 2 being placed in position in the machine, strand 3 is fed into the device in a direction at right angles to its subsequent movement. 4 indicates a circular and oscillatory member that constitutes a loop-forming and feeding means, it being provided with a thread-receiving groove 5, parallel to its axis of oscillation, for the reception of the central portion of strand 3 (Fig. 20), and with circumferential loop-forming grooves 6. Rotation of member 4 in the direction indicated in Fig. 21 draws the outer portions of the strand into grooves 6 and forms said strand into an open loop L or double strand with its free ends L1 pointing toward seal 1. Direction of rotation of member 4 is now reversed, whereby free ends L1 of the strand are threaded through outer openings 7 of seal 1 and through outer openings 8 of guard 2 (Fig. 22). Free ends L1 now pass through fixed guides, to be described at a later point in the specification, whereby said free ends L1 are reversed to form two reverse loops L2 and L3, after which said free ends are threaded back through central opening 11 of guard 2 and through the two inner openings 12 of seal 1 (Fig. 23). This completes the threading operation, and the threaded seal assemblage is then discharged from the machine (Fig. 24).

The instrumentalities for carrying out the above-described operations will now be explained.

Strand 3 can be fed from any suitable source such as a reel (not shown) and enters the machine from the left-hand side as viewed in Figs. 1, 3 and 7. The means for accomplishing this may vary but, in this instance, a reciprocatory feed device, generally designated by A, is employed. 14 indicates a track on which carriage 15, of device A, slides, and 16 is a picker pin (Figs. 3, 30, 31 and 32) carried by carrier 15 that engages strand 3 and places it in transverse groove 17 of table 18 (Figs. 1, 3 and 7), which groove 17 is in line with groove 5 of member 4 when the latter occupies the position shown in Fig. 20. Inasmuch as carriage 15 also is associated with the stripping and ejecting devices for the threaded assemblage, it will, in the interest of clarity, be better to defer an explanation of the detail members carried by carrier 15, and to describe, at this point, only the means for imparting a reciprocating motion to carriage 15.

Power is supplied to the machine from any suitable source, such as motor 19 (Fig. 3), and is transmitted through a suitable speed reduction unit 20 to shaft 21 carrying pinion 22. Referring now to Figs. 1, 2 and 3, said pinion 22 meshes with a gear 23 on shaft 24, which latter carries at its other end a pinion 25 that meshes with a gear 26 on shaft 27. Any suitable means can be employed to reciprocate carriage 15 from shaft 27 but, in the present instance, these means take the following form: Pivotally supported at 28 is an oscillatory member or connection 29, the upper end of which is provided with a slot 30 in which engages a roller 31 mounted on carriage 15. 32 indicates a roller slidably mounted in slot 33 of connection 29, and this roller 32 also travels in slotted guide 34 of shaft 27 or gear 26. It will be understood that rotation of guide 34 imparts an oscillatory motion to connection 29, which latter, in turn, effects reciprocation of carriage 15.

Referring to Figs. 7, 8 and 9, as well as to Figs. 1, 2 and 3, the reference character B indicates, generally, means for severing a length of strand from the source of supply, after said length of strand has been fed across the machine. The severing means, as such, consist essentially of a stationary knife 35 and a movable knife 36 and actuating means for the latter. In the present instance, such actuating means take the following form: Knife 36 is mounted on a rockshaft 37, which latter is rocked by pivotally and slidably connected links 38 and 39. Link 39 is carried by a reciprocatory member 40, slidably mounted in the framework, and normally held in its upper position by rotating cam 41. This cam has a sharp drop at 42 to effect a quick severing movement of movable knife 36. Cam 41 is mounted on shaft 43 which is driven from shaft 27 by means of a pair of bevel gears 44. 45 indicates a holding device to prevent the leading end 3a, of the next strand to be severed, from slipping out of the machine. This holding device is a pin, pivotally supported at 46, and is free to swing to the right (in Fig. 8) to permit infeeding of the strand, but will move to the left only far enough to engage the strand and thereby prevent its withdrawal.

Loop forming and feeding member 4 is mounted on a shaft 48 (now turn to Figs. 4, 5, 6, 7, 10, 11 and 12, as well as to Figs. 1, 2 and 3) that is oscillated by the following means: 49 indicates a reciprocatory rack slidably mounted in guides 50. Bolted at 51 to said rack is a cam plate 52 having a cam groove 53. Mounted on shaft 43 is an arm 54 carrying a cam roll 55 adapted to engage cam groove 53 in cam plate 52, thereby reciprocating rack 49. 56, 57 and 58 indicate a train of pinions that transmits the reciprocating movement of rack 49 to effect oscillation of shaft 48 that carries member 4. When member 4 turns in one direction, strand 3 is drawn into circumferential grooves 6 (Fig. 21), and, upon reversal of its direction of movement, the free ends L1 of the double strand or loop L are threaded through the sealing means. It is pointed out here that member 4 constitutes the sole feeding means employed in threading and reversely threading the strand through the sealing means, as will presently appear more clearly.

Perforated sealing member 1 can be introduced into the machine in any suitable manner. As here shown, 59 (Figs. 1, 3, 4 and 10) indicates a chute through which the seals are fed, by hand or otherwise, one by one, into position to receive the strand. When so introduced, seal 1 (Figs. 10, 11 and 12) lies on lower guide die 60 and between the latter and upper guide die 61.

Guard member 2, if used, is introduced into the machine through a chute 62 (see particularly Figs. 10, 11, 12 and 13) that is pivotally supported at 63 in a bracket 64 carried by upper guide die 61. Upper guide die 61 has an up-and-down motion, to be presently described, and this up-and-down motion is utilized, to swing chute 62 on pivot 63 to thereby feed one guard 2 at a time into threading position, by the following means: 65 indicates a cam pivotally supported at 66 on lower guide die 60, and 67 indicates an arm carried by chute 62 to engage said cam 65. It will be seen that, when upper guide die 61 moves down toward lower guide die 60, chute 62 will swing toward the left, as viewed in Fig. 12, and the lowermost guard 2 in the stack will therefore drop into position on guard support 68. 70 denotes a holding dog carried by lower guide die 60 normally urged into a retracted position by pull-spring 71 and moved into an advanced position by means of a cam rod 72 that engages cam 73 on dog 70. The holding dog, when in its forward position (Fig. 12), engages the inside of guard 2. Guard support 68 and cam rod 72 both have reciprocating movements. Upper guide die 61 is moved up and down by means of rods 74. Turn now to Figs. 1, 3 and 4, as well as to Figs. 10, 11 and 12, for an explanation of the means for actuating 68, 72 and 74. Mounted on shaft 27 is a cam 75 with which engages a cam roll 76 carried by sliding frame 77. This frame supports rods 74 that slide in bushings 78 of the framework, and said rods are connected to the upper guide die 61 by means of nuts 79. Frame 77 has an extension 80 that engages spring 81 surrounding guard support 68 and interposed between said extension 80 and a collar 82. Thus, when the upper guide die 61 is moved upwardly (Fig. 4), guard support 68 is likewise elevated, and, as this occurs after the strand has been threaded and reversely threaded through the sealing means, the threaded assemblage is freed from lower guide die 60 by the action of guard support 68 against the guard of the threaded assemblage. Also mounted on shaft 27 is another cam 83 that engages lower end 84 of cam rod 72 to lift the same so as to move holding dog 70 into engagement with guard 2. It will be understood that, so long as spring 69 holds chute 62 against bracket 64 (to the right as viewed in Fig. 11), the lowermost guard 2 in the stack cannot drop into position on guard support 68, it being prevented from so doing by ledge 85 of the upper guide die.

Referring now particularly to Figs. 18, 19, 26 and 27, as well as to Figs. 1, 4, 10, 11, 12, 13, 14 and 16, the means for reversing the direction of movement of free ends Ll of the looped double strand will be described. As previously pointed out, 60 indicates a lower guide die and 61 an upper guide die, which latter is lifted and lowered by the means, already recited, which consist generally of members 74 and their actuating devices. These guide dies when in their closed position, that is: when the upper guide die is down against the lower guide die, form guiding channels provided with elliptical portions for reversing the direction of movement of the free ends of the strand and to rethread them through the sealing means. That free end Ll of the looped strand, that passes through one perforation 7 of member 1 and perforation 8 of guard 2, enters the guide dies through opening 86 (Figs. 19 and 26) and, after having its direction reversed, emerges through opening 87 and is then threaded through center opening 11 of guard 2 and through one of perforations 12 of member 1. The other free end Ll of the looped strand, that passes through the other perforation 7 of member 1 and through perforation 8 of guard 2, enters the guide dies through opening 88 and, after having its direction reversed, emerges through opening 89 and is then threaded through center opening 11 of guard 2 and through one of perforations 12 of member 1. 90 indicates (Fig. 13) one channel through which one free end Ll of the strand travels at one level and 91 indicates the other channel through which the other free end Ll travels at another level. Two features are to be noted in connection with these guide dies and their channels. One is that they are non-propelling—that is to say: they have no feeding means that engage and move the strands; the other is that the strand ends are reversed by traveling through elliptical portions of the channels—that is to say: the strand ends are not forced into a semi-circular path. In other words: all the feeding is done by member 4 located at one side of sealing member 1, when in threading position, and the reversing means, consisting of the guide dies and their channels, located on the other side of said member 1, merely guide or direct, without propelling, the free ends of the strand. Lower guide die 60 is provided with a central guiding member 92, in which holding dog 70 slides, having a wall 93 that extends partially around said member 92 at one side thereof, which wall 93 separates channels 90 and 91 at that side of member 92. 94 indicates another wall, at the other side of said member 92, but in spaced relation to the latter, and separates channels 90 and 91 at that side of central guide 92. Upper guide die 61 (shown in an inverted position in Fig. 18 and a portion thereof in perspective in Fig. 27) is provided with complementary walls 95 and 96 that form curved non-semi-circular end portions or continuations of channels 90 and 91 and have as shown a curvature of lesser degree than that of a semicircle. Said guide dies are also provided with openings 97 and 98 through which guard member 2 passes.

It is now the time to return to a consideration of carriage 15, the instrumentalities carried thereby, and the means operated by its traverse. Consult now Figs. 28 to 32 inclusive, as well as Figs. 1, 3, 4, 10, 11, 12 and 17. As previously pointed out, 16 indicates a needle to engage and disengage strand 3. Needle 16 is carried by a vertically slidable member 100 movable in bracket 101 of carriage 15. Member 100 is provided with a cam face 102, and 103 indicates a horizontally slidable cam which, when moved in one direction (into the position shown in Fig. 30), permits spring 104 to bring pin 16 into engagement with strand 3, and which, when moved in the other direction (into the position shown in Fig. 31), raises member 100 against the tension of spring 104 and causes pin 16 to disengage strand 3. 105 and 106 indicate two stops (Figs. 1, 3, 7, 8, 9 and 31), one at each end of the traversing movement of carriage 15. When carriage 15 comes to the end of its stroke in a left-hand direction (as viewed in Fig. 1), stop 105 pushes against cam 103 and moves it into the position shown in Fig. 30, thereby causing pin 16 to engage strand 3. When carriage 15 comes to the end of its stroke in a right-hand direction (as viewed in Fig. 1), stop 106 pushes against cam 103 and moves it into position shown in Fig. 31 and causes pin 16 to disengage strand 3, a length of which now lies in groove 17 of table 18 and in groove 5 of cylinder 4 (Fig. 20). 107 indicates a stripper, slidingly mounted in guides 108 of table 18, and provided with two inclined deflecting grooves 109 to receive free ends Ll of the returning strand, as they emerge from perforations 12 of sealing member 1, at 61a between the upper and lower guide dies. The free ends Ll are thereby carried above the plane of member 4 (see especially Figs. 15, 17 and 24), and this action also assists in freeing the threaded assemblage from the elements of the machine. Said stripper is provided with a pin 110 to engage in slot 111 of cam lever 112 pivoted at 113, which lever 112 is urged into the position shown in Fig. 10 by means of spring 114. Stop 115 (Figs. 1 and 28) is carried by arm 101 of carriage 15 to engage cam lever 112 during the traverse of said carriage 15. When carriage 15 moves to the right, as viewed in Fig. 1, stop 115 will engage cam lever 112 to retract stripper 107 against the tension of spring 114 to clear the way for the ejection of the threaded assemblage, to be presently described. On the return stroke of carriage 15, to the left as viewed in Fig. 1, stop 115 again retracts cam lever 112, but this is an idle motion devoid of function. 116 is an ejector member pivotally supported at 117 on carriage 15 and carrying a pendent lever 118 to engage stop 119 (Figs. 1, 4 and 28). 120 is a spring that normally holds ejector 116 in the position shown in Fig. 1. When carriage 15 advances from its left-hand position to its right-hand position (as viewed in Fig. 1), pendent lever 118 encounters stop 119, thereby imparting a swift ejecting movement to ejector 116 to thereby eject the threaded assemblage into chute 121 and thus out of the machine. On the stroke of carriage 15 in a left-hand direction, as viewed in Fig. 1, lever 118 yields when it encounters stop 119, and does not actuate ejector 116.

The general operation of the machine is as follows:

At the beginning of a cycle of movements of the machine, the guide dies are in their open position, upper guide die 61 being in an upper position, and the threaded assemblage, produced during the previous cycle, lying in lower guide die 60; guard chute 62 is in its closed position, guard support 68 is in its upper position, and holding dog 70 has been retracted by the lowering of cam rod 72 and by the action of spring 71. Carriage 15 being in its left-hand position, as viewed in Fig. 1, needle 16 now engages strand 3 and carriage 15 begins its traverse to the right, as viewed in Fig. 1, thereby laying strand 3 in groove 17 of table 18 and in groove 5 of oscillating member 4, after which pin 16 disengages the strand. When the strand has been so laid, it is cut off from the supply by severing knife 36. During the transit of carriage 15 to the right, as viewed in Fig. 1, stop 115, on arm 101 of said carriage, engages cam lever 112 and retracts stripper 107, thus entirely freeing the previously formed assemblage, and now stop 119 actuates ejector 116 and ejects said previously formed assemblage onto discharge chute 121. Looping and feeding device 4 begins its backward rotation to form the strand into a loop, sealing member 1 is fed into threading position, and upper guide die 61 descends, thereby bringing the guide dies into closed position. The descending movement of upper guide die 61 releases a guard 2 and drops it on guard support 68, which latter is now in its lower position, and holding dog 70 moves into engagement with guard 2 under the influence of the rising movement of cam rod 72. Looping and feeding device 4 reverses its rotation and advances free ends L1 of the double strand into the sealing and guard members 1 and 2 and into the guide dies, and as said device 4 continues its feeding movement of the double strand, guide dies 60 and 61 reverse the direction of free ends L1 of said strand and rethread them through guard 2 and sealing member 1. When free ends L1 emerge, after being rethreaded, they pass up the incline of stripper 107, the guide dies open by the rise of upper guide die 61, guard support 68 rises, and dog 70 is retracted by its spring 71 by reason of the lowering of cam rod 72. Meanwhile, carriage 15 has returned to its position to the left, as viewed in Fig. 1.

I claim:

1. In a threading machine in which a looped double strand is to be threaded and rethreaded through a perforated sealing member, the combination with feeding means, located wholly on one side of the sealing member when in threading position, to advance the looped strand with the free ends thereof toward and through the sealing member; of non-propelling guiding dies, located on the other side of the sealing member when in threading position, having guiding channels provided with curved non-semi-circular end portions, having a curvature of lesser degree than that of a semi-circle, for reversing the direction of movement of the free ends of the strand and to rethread them through the sealing member.

2. In a threading machine, the combination with a circular and oscillatory member having a thread-receiving groove parallel to its axis of oscillation, and two circumferential loop-forming grooves; of means to feed a strand of flexible material to lay the central portion thereof in said thread-receiving groove; and actuating devices and connections to turn the oscillatory member first in one direction to draw the outer portions of the strand into the circumferential grooves to thereby form a looped double strand, and to thereafter turn the oscillatory member in the other direction to feed said double strand out of the circumferential grooves.

MICHAEL MITCHKO.